(12) United States Patent
Meier et al.

(10) Patent No.: US 9,097,449 B2
(45) Date of Patent: Aug. 4, 2015

(54) PRESSURE BASED CONTROL OF PARALLEL COMPRESSORS IN MULTIPLE REFRIGERATION UNITS

(75) Inventors: Richard Meier, Palmetto, FL (US); Varun Rajasekaran, Chennai (IN); Daniel Quinones, Orlando, FL (US)

(73) Assignee: HOBART BROTHERS COMPANY, Troy, OH (US)

( * ) Notice: Subject to any disclaimer, the term of this patent is extended or adjusted under 35 U.S.C. 154(b) by 1021 days.

(21) Appl. No.: 11/863,998

(22) Filed: Sep. 28, 2007

(65) Prior Publication Data

US 2009/0084120 A1  Apr. 2, 2009

(51) Int. Cl.
*F25B 5/04* (2006.01)
*F25B 49/02* (2006.01)
*F25B 6/02* (2006.01)
(Continued)

(52) U.S. Cl.
CPC ............... *F25B 49/022* (2013.01); *B64F 1/362* (2013.01); *F25B 49/027* (2013.01); *B64F 1/364* (2013.01); *F24F 2011/0067* (2013.01); *F25B 5/04* (2013.01); *F25B 6/02* (2013.01); *F25B 2400/06* (2013.01); *F25B 2400/075* (2013.01); *F25B 2500/07* (2013.01); *F25B 2500/26* (2013.01); *F25B 2500/27* (2013.01); *F25B 2600/0251* (2013.01); *F25B 2600/111* (2013.01); *F25B 2600/112* (2013.01); *F25B 2700/1931* (2013.01); *F25B 2700/1933* (2013.01); *F25B 2700/21152* (2013.01); *F25B 2700/21161* (2013.01)

(58) Field of Classification Search
CPC .... B64F 1/364; B64F 1/362; F25B 2400/075; F25B 2400/06; F25B 6/02; F25B 2500/07; F25B 2500/26; F25B 2500/27; F24F 2011/0067

USPC ............. 62/228.3, 228.5, 175, 335, 181
See application file for complete search history.

(56) References Cited

U.S. PATENT DOCUMENTS 4,326,387 A * 4/1982 Friedman ................. 62/184
4,835,977 A * 6/1989 Haglund et al. ........... 62/89
4,932,220 A   6/1990 Inoue
(Continued)

FOREIGN PATENT DOCUMENTS

GB   2 223 607 A    4/1990
GB   2223607    * 11/1990 ............ F25B 49/00
(Continued)

OTHER PUBLICATIONS

Machine translation of WO 2004055455, performed by WIPO at http://www.wipo.int/patentscope/en/.*

(Continued)

*Primary Examiner* — Marc Norman
*Assistant Examiner* — Max Snow
(74) *Attorney, Agent, or Firm* — Fletcher Yoder P.C.

(57) ABSTRACT

This patent is directed to an external air conditioning system connected to a parked airplane. The system has multiple refrigeration units. Each refrigeration unit has a controller. Each refrigeration unit's controlled is linked to a common controller. A single stream of air flows through all of the evaporators in series. Each of the refrigeration units has multiple compressors. Additional compressors are activated or deactivated based on refrigerant pressure. The activation or deactivation pressures are staggered across the refrigeration units, thus coordinating operation of the multiple refrigeration units.

16 Claims, 3 Drawing Sheets

(51) Int. Cl.
*B64F 1/36* (2006.01)
*F24F 11/00* (2006.01)

(56) References Cited

U.S. PATENT DOCUMENTS

| | | | |
|---|---|---|---|
| 5,050,397 A * | 9/1991 | Sugiyama et al. | 62/175 |
| 5,205,130 A * | 4/1993 | Pannell | 62/236 |
| 5,265,434 A | 11/1993 | Alsenz | |
| 5,383,335 A * | 1/1995 | Anderson et al. | 62/89 |
| 5,385,030 A | 1/1995 | Kitagawa | |
| 2002/0184902 A1 * | 12/2002 | Rohrbach et al. | 62/175 |
| 2005/0217283 A1 | 10/2005 | Seelinger | |
| 2007/0005191 A1 * | 1/2007 | Sloup et al. | 700/276 |
| 2008/0041077 A1 * | 2/2008 | Tutunoglu | 62/186 |
| 2008/0087040 A1 * | 4/2008 | Oshitani et al. | 62/500 |

FOREIGN PATENT DOCUMENTS

| | | | |
|---|---|---|---|
| WO | 2004/055455 A1 | 7/2004 | |
| WO | WO 2004055455 * | 7/2004 | F25B 49/00 |

OTHER PUBLICATIONS

PCT International Search Authority, Written Opinion from PCT/US2008/077999; International Search Report from PCT/US2008/077999.

* cited by examiner

PRESSURE BASED CONTROL OF PARALLEL
COMPRESSORS IN MULTIPLE
REFRIGERATION UNITS

BACKGROUND

The present invention relates generally to systems for providing fresh air to aircraft when parked at a location on the ground. More particularly, the invention relates to a system that can adaptively regulate its operation during periods of considerable thermal load to maintain operation at a reduced level rather than interrupting operation completely.

Various air conditioning systems have been developed for providing conditioned air to aircraft. During flight, power plants (engines) used to drive the aircraft also generate power that can drive on-board conditioned air circulation systems. When parked on the ground, however, conditioned air may be supplied by external means. Air conditioning or refrigeration units may be provided adjacent to such aircraft and coupled to the aircraft by air conduits. Such refrigeration systems, may be either electrically powered or engine-driven. The thermal load encountered by the refrigeration systems, however, can vary greatly, depending upon the part of the world in which the aircraft is operating, the season and environmental temperatures, the size of the aircraft, and the air temperature and flow rates demanded of the refrigeration systems.

A drawback of conventional aircraft conditioned air supply systems, particularly of refrigeration systems, is their reaction to variable thermal loads caused by high or low ambient conditions. Single or multiple refrigeration systems have been provided to allow for reacting to increased loads, and various flow rates, while still maintaining a desired air temperature. However, when external temperatures rise significantly, adding to the thermal load on the refrigeration units, excessive refrigerant pressures may be encountered that force the units to shut down, significantly reducing or interrupting the flow of conditioned air to the aircraft. While the flow of air may be maintained by blowers, the temperature within the aircraft may significantly increase due to the interrupted operation of one or more of the refrigeration system.

There is a need, therefore, for improved approaches to providing conditioned air to parked aircraft. There is a particular need for approaches that will allow continued operation, even if at less than optimal temperatures or flow rates, but that will avoid the shut down of one or more refrigeration units completely.

BRIEF DESCRIPTION

The present invention provides a novel approach to aircraft conditioned air supply designed to respond to such needs. The invention may be applied in a wide range of settings, including in commercial airlines, military and private settings, and so forth. Moreover, the technique may be used with refrigeration systems having redundant refrigeration units or with a single refrigeration unit.

In accordance with certain aspects of the technique, a refrigeration system for supplying air to a parked aircraft is provided that includes parallel compressors, one or more of which can be operated at any time based upon temperatures and actual temperatures of air being supplied to the aircraft, and upon the thermal load. Moreover, the system may include multiple fans for one or more condensers, which may be individually controlled based upon refrigerant pressures. As thermal loads increase, pressures may be monitored or pressure switches may be set and controlled to interrupt operation of one of the compressors, thereby reducing the heat-removal capacity of the system, while maintaining system operation.

In particular embodiments described below, one or more air conditioning systems in a unit may be provided that include generally similar refrigeration circuitry provided with a common blower. The circuitry may function generally similarly, but in a redundant fashion, with certain of the refrigeration units being called into play depending upon the thermal load. As thermal load further increases, beyond the limits of one or more of the refrigeration units, the fans and compressors of each unit may be controlled to maintain refrigerant pressures within design limits, while maintaining some operation of the systems for providing conditioned air to the aircraft, albeit at slightly higher temperatures than desired, or at target temperatures but with reduced flow rates.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
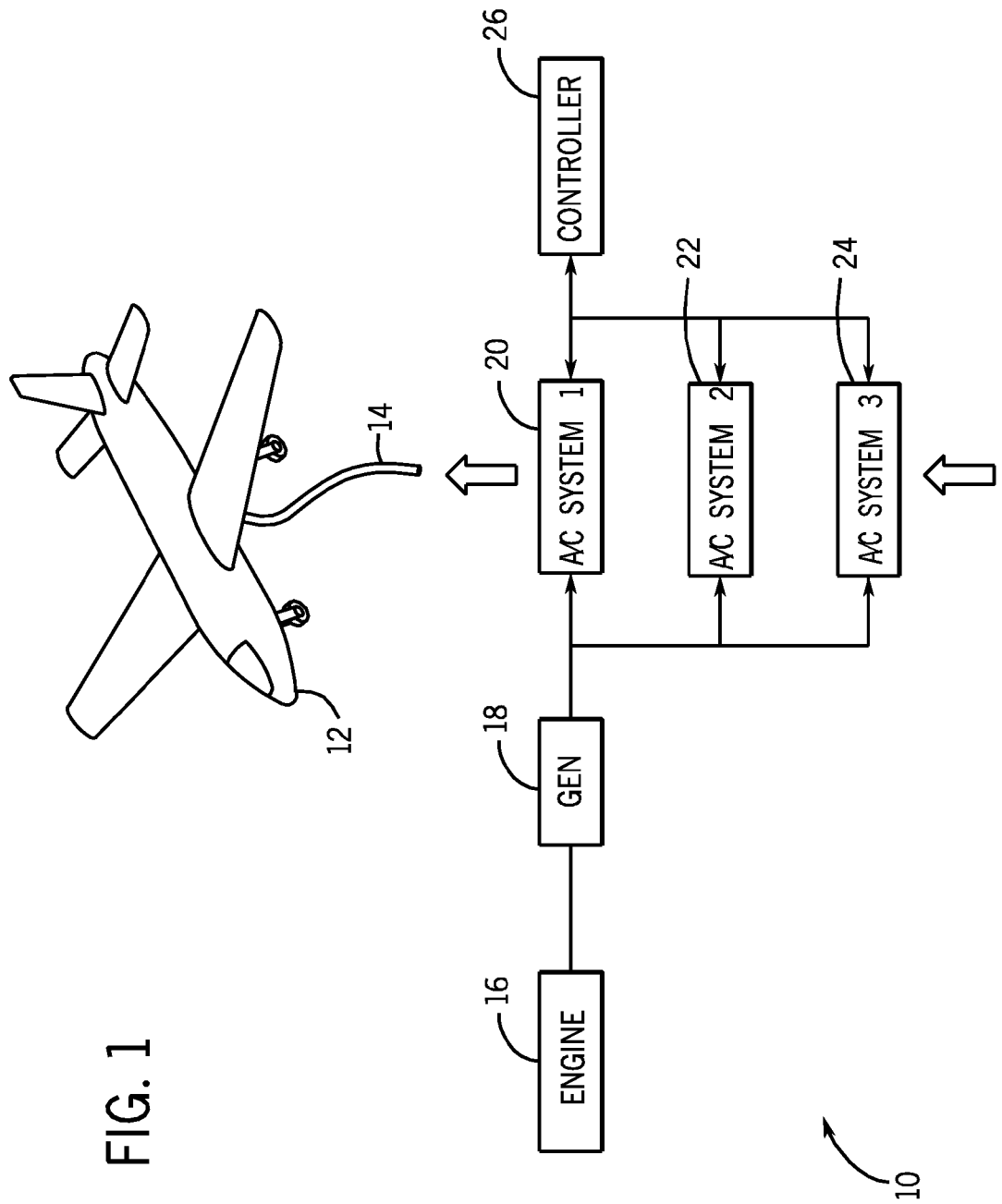
FIG. 1 is a diagrammatical representation of an air conditioning system for a parked aircraft in accordance with certain aspects of the present technique.

Turning now to the drawings, and referring first to FIG. 1, an aircraft air conditioning system 10 is illustrated diagrammatically. The system made to be designed as a stationary or mobile system that can be run electrically from a connection to the power grid, or by an integrated or separate power supply. In many applications, the system can be designed as a cart which can approach an aircraft 12 and supply conditioned air by a conduit 14 which is coupled between the air conditioning system and the aircraft.

In the embodiment illustrated in FIG. 1, the system is operated by power provided by an engine-driven generator set. An internal combustion engine 16, such as a gasoline or diesel engine drives a generator 18 which will typically be associated with appropriate control circuitry for providing output power for the air conditioning units. The air conditioner itself may include one or a series of air conditioning or refrigeration units as indicated by reference numerals 20, 22 and 24 in FIG. 1. As described more fully below, the air conditioning units may be operated simultaneously or may be switched in and out of operation separately based upon thermal load and their individual operating parameters. The air conditioning units may be separately controlled, or their control may be coordinated by a common controller as indicated by reference numeral 26. As noted below, depending upon the instrumentation and control scheme adopted for the refrigeration units, the controller 26 may perform basic functions or may be adapted for more complete integrated control of operation of the various components of the air conditioning units, as well as control of coordinated operation of the units to accommodate the thermal load encountered.

In general, the air conditioning units will provide a flow of conditioned air at a desired temperature to the aircraft. Because aircraft engines will not be available for the refrigeration and circulation of cool air within the aircraft, the air conditioning units are operated to provide the desired airflow. The temperature of the air is typically set at a desired level, as is the airflow rate. Larger aircrafts will typically require a greater air flow rate, and thermal load on the air conditioning units and on the system in general will be determined by such factors as the air flow rate, the desired temperature of the supplied air, and the environmental conditions reigning internally and externally of the aircraft (e.g., outside air temperature), and so forth.

Figure 2:
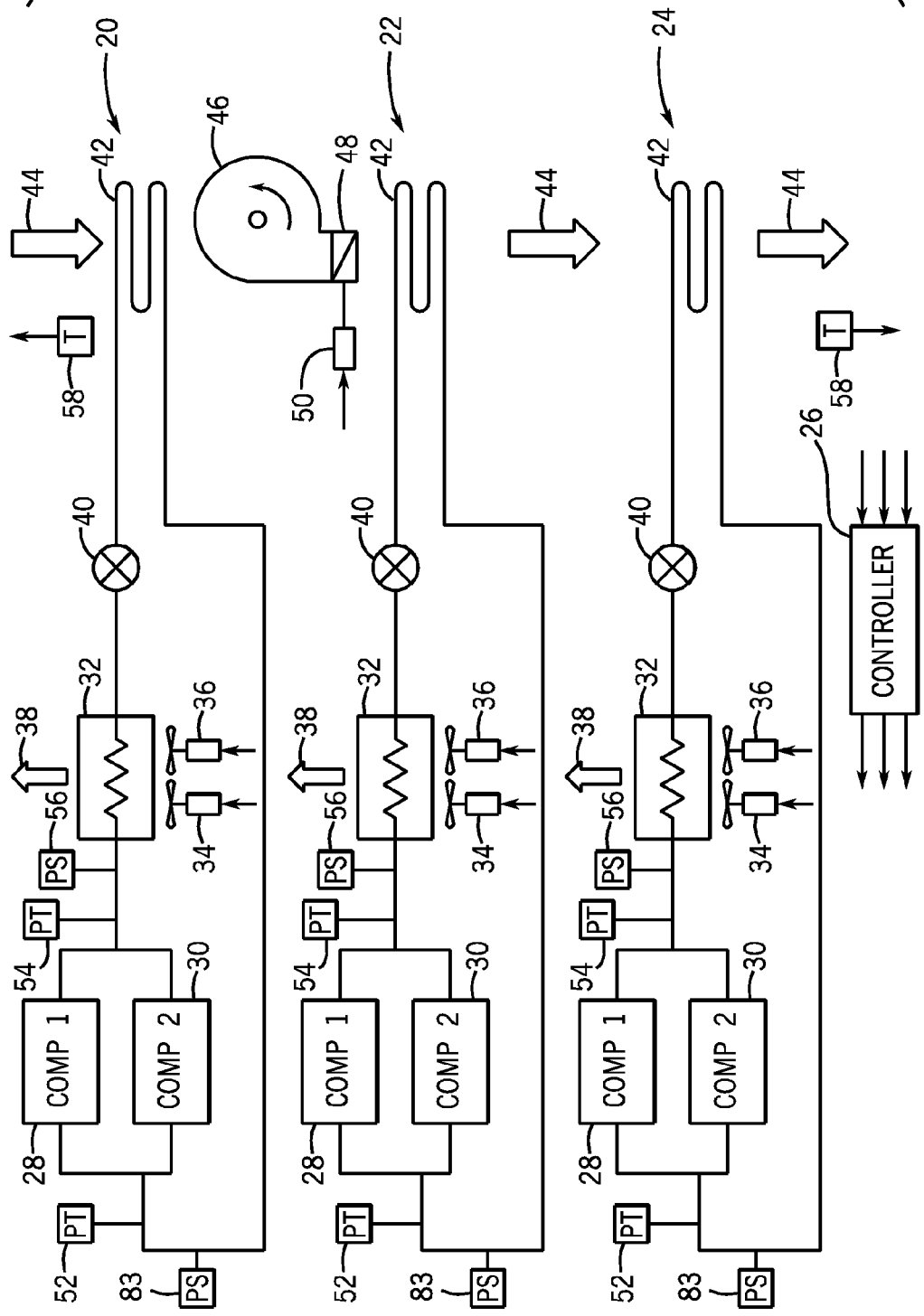
FIG. 2 is a more detailed diagrammatical representation of the air conditioning system including several redundant air conditioning units designed to operate in accordance with the invention.

FIG. 2 illustrates the air conditioning units shown in FIG. 1 in somewhat greater detail. In a presently contemplated embodiment, several such units are provided to offer redundancy in air cooling, and to accommodate various levels of thermal load. Individual components of air conditioning unit 20 are labeled with reference numerals in view of FIG. 2, and will be described in detail below, although similar components are included in air conditioning units 22 and 24, respectively.

As illustrated in FIG. 2, each of the air conditioning or refrigeration units may include a plurality of compressors, as indicated by reference numerals 28 and 30 in FIG. 2 for unit 20, arranged in parallel to compress a refrigerant. Compressed refrigerant is directed from the compressors to a condenser 32. In a presently contemplated embodiment, multiple fans 34 and 36 are provided for each condenser, and may be operated based upon thermal load as described below. The fans draw heat from the pressurized refrigerant and expel hot air stream 38. An expansion valve 40 is provided downstream of the condenser 32. An evaporator coil 42 is provided in the circuit downstream of the expansion valve 40, and draws environmental heat into the refrigerant by evaporation of the refrigerant. Following such phase change, the refrigerant is recirculated to the compressors to complete the refrigeration cycle.

In the embodiment illustrated in FIG. 2, the refrigeration system may be regulated by the controller 26, as may the parallel refrigeration systems 22 and 24. However, the refrigeration systems are preferably coupled to a common plenum and blower arrangement as indicated in FIG. 2 so as to draw incoming air 44 from the surrounding environment. A blower 46 is driven by an electric motor (not shown) and output flow rate from the blower may be regulated by a damper plate 48 which is, itself, controlled by an actuator 50. The actuator 50 is also controlled by the common controller 26. Thus, one or more of the refrigeration or air conditioning units may be operated as described below, and a desired flow rate of air through the parallel systems may be generated and controlled by appropriate regulation of the blower 46 and damper plate 48, under the control of the actuator 50 and controller 26.

In the illustrated embodiment, several parameters are sensed and used for control purposes. In the illustrated embodiment, pressure transducers are utilized to control operation of the compressors and the overall refrigeration units, as well as to operate fans used to draw heat from the condenser 32. As shown in FIG. 2, the units utilize one pressure transducer 54 and one pressure switch 56 upstream of compressors 28 and 30 and one pressure transducer 52 and a pressure switch 83 on the downstream side of the compressors. Moreover, temperature of the air stream is detected at an inlet side as illustrated by temperature sensor 58 in FIG. 2 and downstream of the refrigeration units (not shown in the figures). As described below, the pressure transducers are employed to appropriately control the compressors and fans to react to thermal loads, while the pressure switches are employed as back up devices for control in the event, for example, that the pressure transducers fail, while the temperature sensor is used to provide control of the compressors as well. The temperature sensor may also be used to regulate and coordinate operation of the various refrigeration units. The fans, compressors and their associated motors are also preferably controlled by the central controller 26.

As described below, the compressors of each refrigeration unit may be controlled to respond to temperatures sensed for the system, which will be indicative of the thermal load. The fans associated with the condenser may also be controlled based upon the thermal load. Moreover, the overall system operation, that is, which and how many air conditioning units are employed at any one time may be controlled based upon the thermal load or factors indicative of the thermal load.

Figure 3:
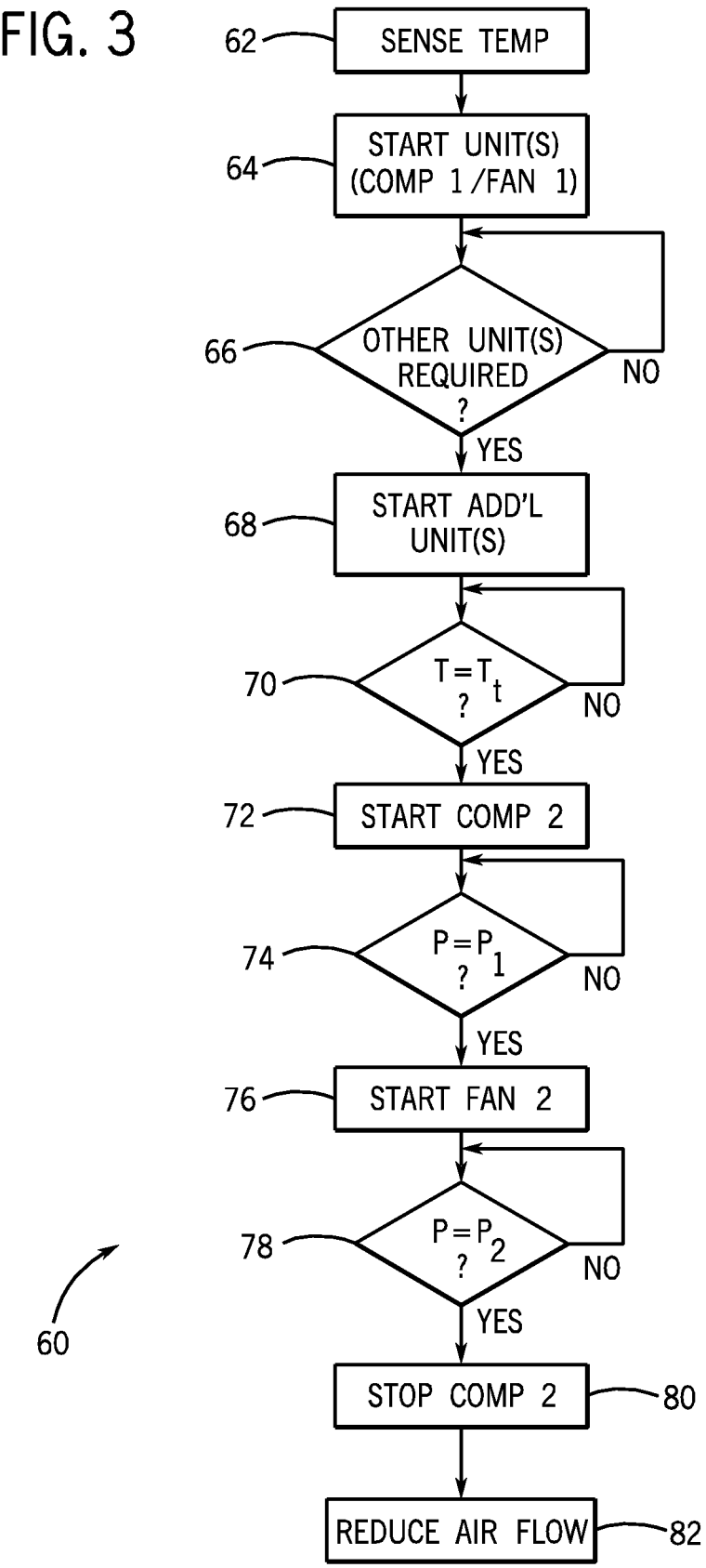
FIG. 3 is a flow chart illustrating exemplary logic for operating the air conditioning system of the previous figures to maintain operation within design limits in response to excessive thermal loads.

An exemplary control scheme for regulating operation of the refrigeration units illustrated in FIG. 2, or one of these units, is shown in FIG. 3. Certain control logic, designated generally by reference numeral 60, is illustrated in FIG. 3 specifically for one of the units, although all of the units may operate similarly. As indicated at step 62, temperatures are first sensed when conditioned air is desired, or when the overall system is placed in an operative state. Again, temperatures will typically be sensed upstream of the refrigeration system and downstream of the system. In a typical application, a set temperature for air exiting the system will be compared to a desired temperature set via a control interface or thermostat. At step 64, then, one or more of the units is started. In a presently contemplated embodiment, one of the units, such as unit 20 will be started first, with one of the compressors being operative and one of the fans being turned on to extract heat from the condenser.

As indicated at step 66, then, following a transition period to allow temperatures to reach a generally steady state level, it may be determined whether additional units are required to obtain the desired temperature of the air stream. If additional cooling is determined to be required, an additional unit may be started as indicated at step 68. If such additional units are started, they may be started in a similar manner, that is, with a single compressor operative and a single fan. Alternatively, control may proceed by increasing the heat-removal capacity of a single one of the units, with a subsequent unit being called into play only as the first unit capacity is reached.

Steps 70-82 summarized in FIG. 3 will typically be carried out for each of the units, although particular levels at which decisions occur (e.g., based upon pressures) may be staggered for each of the units to avoid similar responses of the units at specific pressures, and to ensure an orderly increase in heat removal capacity or, conversely, a decrease in capacity as the design limits of the units are reached.

At step 70, the temperature sensed for the air stream is compared to a target temperature and, if the target temperature cannot be reached or maintained, a second compressor of the refrigeration unit is started. The starting of the second compressor, as indicated at step 72 will increase the heat removal capacity of the refrigeration unit. However, such increase in capacity is not required until and unless the target temperature cannot be reached. Continuously, then, pressures on the refrigeration system are measured by each pressure transducer, and if a desired higher pressure is reached, as indicated at step 74, a second fan is started as indicated at step 76. By way of example, in a presently contemplated embodiment, a refrigerant pressure of approximately 275 psi will cause the controller to start a second fan associated with the condenser 32 to extract more heat from the refrigerant. This should have the effect of reducing or stabilizing the refrigerant pressure and thus responding to the heat load.

If the heat load is still higher, or if the heat load increases, a higher pressure can be expected for the refrigerant exiting the compressors. Pressure transducer 54 (see FIG. 2) is set to a pressure higher than that controlling the operation of the second fan, and as indicated at step 78 in FIG. 3, if this higher pressure is encountered, one of the two compressors of the refrigeration unit is switched off. In a presently contemplated embodiment, for example, this pressure may be approximately 350 psi. In the same presently contemplated embodiment, although one of the compressors is deactivated, both fans at least temporarily stay on to extract heat from the condenser. Stopping the compressor, as indicated at step 80 in FIG. 3, is preferably followed by reducing the overall air flow rate as indicated at step 82 in FIG. 3. Reducing the airflow at step 82 may be performed by adjusting the damper plate 48 (see FIG. 2). Although the air flow rate does not necessarily need to be reduced, its reduction may aid in providing the desired temperature of air to the aircraft, albeit at a reduced flow rate.

The arrangement of FIG. 2 includes additional pressure switches 83 and 56. Pressure switch 83, in the present embodiment, serves to avoid operation of either compressor in the event that incoming refrigerant pressure is too low. Thus, pressure switch 83 can avoid damage to the compressors in such situations. Pressure switch 56, on the other hand, provides a high-pressure shutdown. At some elevated pressure, such as approximately 410 psi, pressure switch 56 will cause the unit to shut down, terminating operation of the refrigeration system. Even at this point, blower 46 may continue to supply a flow of air to the aircraft, albeit at a higher temperature.

It should be noted that the various pressure transducers, pressure switches, and temperature sensors discussed above with reference to unit 20 and steps 70-82 of FIG. 3 may be replicated, although in certain embodiments offset from those of unit 20 for the additional units 22 and 24. That is, the temperatures at which additional fans become operative in each unit, and the pressures at which additional compressors become operative and are then deactivated can be staggered to coordinate operation of the refrigeration units.

Pressure sensors or transducers will be coupled to the controller 26 and will provide inputs for logical operations performed by the controller similar to those discussed above with reference to FIG. 3. That is, the controller can command operation of an additional compressor if the thermal load is higher than anticipated, as indicated by temperatures that do not level off at the desired set points. Similarly, controller 26, based upon detected pressures from the transducers, can control operation of additional fans for the condenser, and can activate and deactivate compressors as discussed above. Such coordinated control can also assist in bringing into operation additional refrigeration units as thermal load increases, and for shutting down compressors and refrigeration units in an organized fashion, cascading with respect to one another when elevated pressures are reached due to even higher thermal loads.

While only certain features of the invention have been illustrated and described herein, many modifications and changes will occur to those skilled in the art. It is, therefore, to be understood that the appended claims are intended to cover all such modifications and changes as fall within the true spirit of the invention. For example, the systems and methods of the invention may employ various refrigeration components and working fluids, including, for example, refrigerants commonly referred to in the field by the designations R22 and R407c. Moreover, it should be noted that, while the invention has been described in the context of portable aircraft conditioned air systems, it may be applied in a variety of settings, including permanent installations, such as for building cooling, as well as on various vehicles, and so forth.

The invention claimed is:

1. A method for providing conditioned air to a parked aircraft on the ground, comprising:
   operating multiple air refrigeration units of a ground aircraft air conditioning system in parallel to refrigerate air for the aircraft, each refrigeration unit comprising multiple compressors and being controlled by a respective controller and all respective controllers being responsive to a common controller;
   controlling a common blower via the common controller to direct a single flow of air through evaporators of all of the multiple air refrigeration units;
   initially operating a single compressor of each refrigeration unit, and subsequently beginning operation of an additional compressor based on refrigerant pressure;
   monitoring refrigerant pressure of the multiple air refrigeration units; and
   discontinuing operation of at least one compressor of at least one refrigeration unit when the refrigerant pressure exceeds a predetermined limit;
   wherein the multiple air refrigeration units and the common blower are physically located outside the aircraft, a predetermined refrigerant pressure is associated with each refrigeration unit, each refrigeration unit's additional compressor begins operation at the associated predetermined refrigerant pressure, and the associated predetermined refrigerant pressures are staggered across the refrigeration units.

2. The method of claim 1, comprising operating a single fan for a condenser of each refrigeration unit, and beginning operation of an additional fan when the refrigerant pressure exceeds a lower predefined limit.

3. The method of claim 1, comprising reducing air flow across an evaporator coil of each refrigeration unit when operation of the compressor is discontinued due to high thermal load.

4. The method of claim 1, comprising sensing pressure and discontinuing operation of the compressor via a pressure transducer.

5. The method of claim 1, wherein each of the multiple air refrigeration units is substantially identical.

6. A method for providing conditioned air to a parked aircraft on the ground, comprising:
   initially operating a single compressor of each refrigeration unit of a plurality of refrigeration units of a ground aircraft air conditioning system to refrigerate air for the aircraft, each refrigeration unit comprising multiple compressors and being controlled by a respective controller and all respective controllers being responsive to a common controller;
   beginning operation of an additional compressor of at least one of the refrigeration units based upon thermal load;
   controlling a common blower via the common controller to direct a single flow of air through evaporators of all of the plurality of refrigeration units; and
   monitoring refrigerant pressure of the plurality of refrigeration units;
   wherein the plurality of refrigeration units and the common blower are physically located outside the aircraft, wherein a predetermined refrigerant pressure limit is associated with each refrigeration unit, each refrigeration unit deactivates at least one compressor upon exceeding the associated predetermined refrigerant pressure limit, and the associated predetermined refrigerant pressure limits are staggered across the refrigeration units.

7. The method of claim 6, comprising operating a single fan for a condenser of each refrigeration unit, and beginning operation of an additional fan when the refrigerant pressure exceeds a lower predefined limit.

8. The method of claim 6, comprising reducing air flow across an evaporator coil of each refrigeration unit when operation of the compressor is discontinued due to high thermal load.

9. The method of claim 6, comprising sensing pressure and discontinuing operation of the compressor via a pressure transducer.

10. The method of claim 6, wherein the thermal load is determined by sensing a temperature of air displaced by the system and ambient conditions.

11. The method of claim 6, wherein each of the plurality of refrigeration units is substantially identical.

12. A system for providing conditioned air to a parked aircraft on the ground, comprising:
a plurality of refrigeration units of a ground aircraft air conditioning system, each refrigeration unit comprising multiple compressors and being controlled by a respective controller and all respective controllers being responsive to a common controller and an evaporator coil coupled to the compressors;
a common blower that displaces a single flow of air across all evaporator coils, wherein the common blower is controlled by the common controller; and
the respective controllers, in cooperation with the common controller being configured to monitor refrigerant pressure of the plurality of refrigeration units, to initially operate a single compressor of each refrigeration unit, to subsequently begin operation of an additional compressor of each refrigeration unit based on the refrigerant pressure, and to discontinue operation of at least one compressor of at least one refrigeration unit when the refrigerant pressure exceeds a predetermined limit;
wherein the plurality of refrigeration units and the common blower are physically located outside the aircraft, a predetermined refrigerant pressure is associated with each refrigeration unit, each refrigeration unit's additional compressor begins operation at the associated predetermined refrigerant pressure, and the associated predetermined refrigerant pressures are staggered across the refrigeration units.

13. The system of claim 12, comprising a pressure transducer or sensor coupled to the respective controllers or to the common controller.

14. The system of claim 12, wherein the common blower is controllable to reduce air flow when operation of a compressor is discontinued due to high thermal load.

15. A method for providing conditioned air to a parked aircraft on the ground, comprising:
operating multiple refrigeration units of a ground aircraft air conditioning system each having multiple refrigerant compressors, wherein the multiple refrigerant compressors are coupled in parallel, to refrigerate air and each of the multiple refrigeration units are controlled by a respective controller, and all respective controllers are responsive to a common controller;
controlling a common blower to direct a single flow of air through evaporators of all of the multiple refrigeration units;
initially operating a single compressor of each of the multiple refrigeration units and subsequently beginning operation of an additional compressor of each of the multiple refrigeration units based on thermal load; and
monitoring refrigerant pressure of the multiple refrigeration units;
wherein the multiple refrigeration units and the common blower are physically located outside the aircraft, a predetermined refrigerant pressure limit is associated with each of the multiple refrigeration units, each of the multiple refrigeration units deactivates at least one compressor upon exceeding the associated predetermined refrigerant pressure limit, and the associated predetermined refrigerant pressure limits are staggered across the multiple refrigeration units.

16. A method for providing conditioned air to a parked aircraft on the ground, comprising:
operating multiple refrigeration units of a ground aircraft air conditioning system each having multiple refrigerant compressors, wherein the multiple refrigerant compressors are coupled in parallel, to refrigerate air and each of the multiple refrigeration units are controlled by a respective controller, and all respective controllers are responsive to a common controller;
wherein the multiple refrigeration units and the common blower are physically located outside the aircraft;
controlling a common blower to direct a single flow of air through evaporators of all of the multiple refrigeration units;
monitoring the refrigerant pressure of the multiple refrigeration units; and
performing at least one of the following two controls:
Control 1:
initially operating a single compressor of each refrigeration unit, and subsequently beginning operation of an additional compressor based on refrigerant pressure;
wherein a first predetermined refrigerant pressure is associated with each refrigeration unit;
wherein each refrigeration unit's additional compressor begins operation at the associated first predetermined refrigerant pressure;
wherein the associated first predetermined refrigerant pressures are staggered across the refrigeration units;
Control 2:
initially operating a single compressor of each refrigeration unit, and subsequently beginning operation of an additional compressor based on thermal load;
wherein a second predetermined refrigerant pressure limit is associated with each refrigeration unit;
wherein each refrigeration unit deactivates at least one compressor upon exceeding the associated second predetermined refrigerant pressure limit;
wherein the associated second predetermined refrigerant pressure limits are staggered across the refrigeration units.

* * * * *